(12) United States Patent
Zhang et al.

(10) Patent No.: US 12,395,443 B2
(45) Date of Patent: Aug. 19, 2025

(54) METHOD, APPARATUS, AND SYSTEM FOR IMPLEMENTING CONGESTION CONTROL

(71) Applicant: Huawei Technologies Co., Ltd., Shenzhen (CN)

(72) Inventors: Yali Zhang, Beijing (CN); Zhaoxia Yuan, Shenzhen (CN); Mengzhu Liu, Beijing (CN); Yinben Xia, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 542 days.

(21) Appl. No.: 17/747,281

(22) Filed: May 18, 2022

(65) Prior Publication Data

US 2022/0278936 A1 Sep. 1, 2022

Related U.S. Application Data

(63) Continuation of application No. PCT/CN2020/116549, filed on Sep. 21, 2020.

(30) Foreign Application Priority Data

Nov. 18, 2019 (CN) .......................... 201911129885.4

(51) Int. Cl.
*H04L 47/2483* (2022.01)
*H04L 45/00* (2022.01)
*H04L 47/52* (2022.01)
*H04L 47/62* (2022.01)

(52) U.S. Cl.
CPC .......... *H04L 47/2483* (2013.01); *H04L 45/20* (2013.01); *H04L 47/521* (2013.01); *H04L 47/6215* (2013.01)

(58) Field of Classification Search
CPC ... H04L 47/2483; H04L 45/20; H04L 47/521; H04L 47/6215; H04L 47/263; H04L 47/25
See application file for complete search history.

(56) References Cited

U.S. PATENT DOCUMENTS

| 5,668,948 A | 9/1997 | Belknap et al. |
| 5,978,357 A | 11/1999 | Charny |

(Continued)

FOREIGN PATENT DOCUMENTS

| CN | 1119812 A | 4/1996 |
| CN | 101640639 A | 2/2010 |

(Continued)

*Primary Examiner* — Wutchung Chu
(74) *Attorney, Agent, or Firm* — Conley Rose, P.C.

(57) ABSTRACT

A method for implementing congestion control includes: obtaining congestion control information of a first network device, where the congestion control information includes a total bandwidth of a first egress port of the first network device and a quantity of active flows corresponding to a first queue of the first egress port; and determining a sending rate of a first data flow in the active flows based on the congestion control information, where the sending rate is positively related to the total bandwidth and negatively related to the quantity of active flows, and the sending rate is used by a sending device of the first data flow to send the first data flow.

20 Claims, 7 Drawing Sheets

(56) References Cited

U.S. PATENT DOCUMENTS

| | | | |
|---|---|---|---|
| 6,081,513 A * | 6/2000 | Roy | H04Q 11/0478 379/202.01 |
| 8,949,444 B1 * | 2/2015 | Ma | H04L 47/27 709/228 |
| 9,014,264 B1 | 4/2015 | Cheng et al. | |
| 9,973,436 B2 * | 5/2018 | Lee | H04L 47/2483 |
| 11,082,474 B2 * | 8/2021 | Choi | H04N 21/8456 |
| 2003/0084283 A1 * | 5/2003 | Pixton | H04H 60/23 713/163 |
| 2005/0021830 A1 * | 1/2005 | Urzaiz | H04L 47/10 709/233 |
| 2007/0280245 A1 | 12/2007 | Rosberg | |
| 2010/0027425 A1 | 2/2010 | Cheung et al. | |
| 2010/0260048 A1 * | 10/2010 | Dolganow | H04L 67/61 370/235 |
| 2014/0119183 A1 * | 5/2014 | Wu | H04L 47/20 370/235 |
| 2014/0226475 A1 | 8/2014 | Stewart | |
| 2015/0074285 A1 | 3/2015 | Gahm et al. | |
| 2015/0117186 A1 * | 4/2015 | Uchida | H04W 28/20 370/230 |
| 2015/0295827 A1 * | 10/2015 | Zhu | H04L 65/80 370/230 |
| 2016/0255009 A1 | 9/2016 | Ramaiah et al. | |
| 2016/0285771 A1 | 9/2016 | Kulkarni | |
| 2018/0026898 A1 | 1/2018 | Lee et al. | |
| 2018/0069786 A1 | 3/2018 | Lokman et al. | |
| 2018/0131613 A1 | 5/2018 | Fraser | |
| 2019/0028374 A1 * | 1/2019 | Xu | H04L 45/02 |
| 2019/0166053 A1 * | 5/2019 | Kameyama | H04L 41/0896 |
| 2020/0187054 A1 * | 6/2020 | Osuga | H04W 28/10 |
| 2021/0007004 A1 | 1/2021 | Xu et al. | |
| 2021/0211379 A1 | 7/2021 | Liu et al. | |
| 2021/0211380 A1 * | 7/2021 | Liu | H04L 47/10 |
| 2022/0278936 A1 * | 9/2022 | Zhang | H04L 45/20 |
| 2024/0205155 A1 * | 6/2024 | Erman | H04L 47/12 |
| 2024/0259318 A1 * | 8/2024 | Lokhandwala | G06F 15/17331 |

FOREIGN PATENT DOCUMENTS

| | | | | |
|---|---|---|---|---|
| CN | 101854366 A | | 10/2010 | |
| CN | 101945039 A | | 1/2011 | |
| CN | 102546202 A | | 7/2012 | |
| CN | 103916329 A | | 7/2014 | |
| CN | 104303465 A | | 1/2015 | |
| CN | 104734905 A | | 6/2015 | |
| CN | 105531968 A | | 4/2016 | |
| CN | 106533970 A | | 3/2017 | |
| CN | 107431666 A | | 12/2017 | |
| CN | 107454015 A | | 12/2017 | |
| CN | 109067665 A | | 12/2018 | |
| CN | 109245959 A | | 1/2019 | |
| CN | 109995608 A | * | 7/2019 | |
| CN | 110166366 A | | 8/2019 | |
| EP | 0701371 B1 | | 4/2000 | |
| EP | 4050855 A1 | * | 8/2022 | H04L 45/20 |
| WO | WO-2021098368 A1 | * | 5/2021 | H04L 45/20 |

\* cited by examiner

METHOD, APPARATUS, AND SYSTEM FOR IMPLEMENTING CONGESTION CONTROL

CROSS-REFERENCE TO RELATED APPLICATIONS

This is a continuation of Int'l Patent App. No. PCT/CN2020/116549 filed on Sep. 21, 2020, which claims priority to Chinese Patent App. No. 201911129885.4 filed on Nov. 18, 2019, both of which are incorporated by reference.

FIELD

Embodiments of the present disclosure relate to the field of communication technologies, and in particular, to a method, apparatus, and system for implementing congestion control.

BACKGROUND

In a communication network, network congestion is an important factor affecting network performance. Congestion control has always been an important means to guarantee network service quality.

A common method for performing the congestion control is that a receiving device of a data flow determines a sending rate of the data flow based on bandwidth usage of an ingress port, and sends the sending rate to a sending device of the data flow. Then, the sending device sends the data flow based on the sending rate.

A network status cannot be accurately reflected based on a status of the receiving device. Therefore, the congestion control cannot be accurately performed based on a sending rate determined according to the method. This results in poor congestion control effect.

SUMMARY

Embodiments provide a method, apparatus, and system for implementing congestion control. This resolves poor congestion control in the conventional technology.

According to a first aspect, a method for implementing congestion control is provided. The method includes: obtaining first information of a first network device, where the first information includes a total bandwidth of a first egress port of the first network device and a quantity of active flows corresponding to a first queue of the first egress port; and determining a sending rate of a first data flow in the active flows based on the first information, where the sending rate is positively related to the total bandwidth and negatively related to the quantity of active flows (for example, inversely proportional to the quantity of active flows), and the sending rate is used by a sending device of the first data flow to send the first data flow.

According to an implementation of the first aspect, because information used to determine a sending rate of a data flow includes a total bandwidth of an egress port of a network device and a quantity of active flows corresponding to a queue of the egress port, a status of the network device can be accurately reflected. Therefore, the sending rate determined according to this implementation can effectively implement the congestion control.

According to a second aspect, a method for implementing congestion control is provided. The method includes: obtaining first information of a first network device, where the first information includes a total bandwidth of a first egress port of the first network device and a quantity of target sending devices, and the target sending device is a sending device of an active flow corresponding to a first queue of the first egress port; and determining a total sending rate of a target data flow based on the first information, where the target data flow is all data flows that are sent by a first sending device in the target sending devices by using the first network device and that correspond to the first queue, the total sending rate is positively related to the total bandwidth and negatively related to the quantity of target sending devices (for example, inversely proportional to the quantity of target sending devices), and the total sending rate is used by the first sending device to send the target data flow.

According to a third aspect, a method for implementing congestion control is provided. The method includes: obtaining a first rate, where the first rate is used by a first sending device to send a target data flow, and the target data flow includes at least one data flow; and determining a sending rate of each data flow in the target data flow based on the first rate. Then, each data flow in the target data flow is sent based on a corresponding sending rate. Specifically, the data flow is sent at the corresponding sending rate.

According to a fourth aspect, an apparatus for implementing congestion control is provided. The apparatus includes an obtaining unit and a determining unit.

The obtaining unit is configured to obtain first information of a first network device, where the first information includes a total bandwidth of a first egress port of the first network device and a quantity of active flows corresponding to a first queue of the first egress port.

The determining unit is configured to determine a sending rate of a first data flow in the active flows based on the first information, where the sending rate is positively related to the total bandwidth and negatively related to the quantity of active flows, and the sending rate is used by a sending device of the first data flow to send the first data flow.

According to a fifth aspect, an apparatus for implementing congestion control is provided. The apparatus includes an obtaining unit and a determining unit.

The obtaining unit is configured to obtain first information of a first network device, where the first information includes a total bandwidth of a first egress port of the first network device and a quantity of target sending devices, and the target sending device is a sending device of an active flow corresponding to a first queue of the first egress port.

The determining unit is configured to determine a total sending rate of a target data flow based on the first information, where the target data flow is all data flows that are in the active flow and that are from a first sending device in the target sending device, the total sending rate is positively related to the total bandwidth and negatively related to the quantity of target sending devices, and the total sending rate is used by the first sending device to send the target data flow.

According to a sixth aspect, an apparatus for implementing congestion control is provided. The apparatus includes an obtaining unit, a determining unit, and a communication unit.

The obtaining unit is configured to obtain a first rate, the first rate is used to send a target data flow, and the target data flow includes at least one data flow.

The determining unit is configured to determine a sending rate of each data flow in the target data flow based on the first rate.

According to a seventh aspect, a system for implementing congestion control is provided. The system includes a first sending device and a first network device.

The first network device is configured to: obtain first information of the first network device, where the first information includes a total bandwidth of a first egress port of the first network device and a quantity of target sending devices and the target sending device is a sending device of an active flow corresponding to a first queue of the first egress port; and determine a total sending rate of a target data flow based on the first information, where the target data flow is all data flows that are in the active flow and that are from a first sending device in the target sending device, the total sending rate is positively related to the total bandwidth and inversely proportional to the quantity of target sending devices, and the total sending rate is used by the first sending device to send the target data flow; and is further used to send the total sending rate to the first sending device.

The first sending device is configured to: receive the total sending rate from the first network device, and determine a sending rate of each data flow in the target data flow based on the total sending rate.

According to an eighth aspect, a computer storage medium is provided. The computer storage medium stores instructions, and when the instructions are executed by a processor, the method according to the first aspect, the second aspect, or the third aspect is implemented.

Beneficial effects brought by the technical solutions provided include at least the following: Because the information used to determine the sending rate of the data flow includes the total bandwidth of the egress port of the network device and the quantity of active flows corresponding to the queue of the egress port, the status of the network device can be accurately reflected. Therefore, the sending rate determined according to this implementation can effectively implement the congestion control.

BRIEF DESCRIPTION OF THE DRAWINGS

To describe the technical solutions in the embodiments more clearly, the following briefly describes the accompanying drawings.

DETAILED DESCRIPTION

The following describes embodiments with reference to accompanying drawings.

Figure 1:
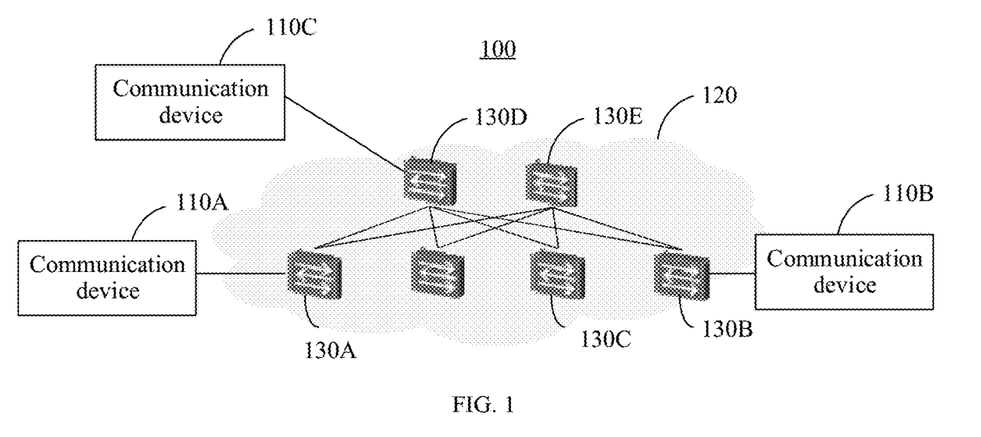
FIG. 1 is a schematic diagram depicting a networking structure of a communication system 100 according to an embodiment.

FIG. 1 is a schematic diagram depicting a networking structure of a communication system 100 according to an embodiment. The communication system 100 includes a communication device 110 and a communication network 120. The communication device 110 may specifically be a user terminal, a server, or the like. Different communication devices 110 may communicate with each other by using the communication network 120. The communication network 120 includes a plurality of network devices 130. The network device 130 may specifically be a switch, a router, or the like.

The communication network 120 includes a network device 130 (for example, a network device 130B) directly connected to the communication device 110 and a network device 130 (for example, a network device 130E) indirectly connected to the communication device 110. In this embodiment, a direct connection between a network device and a communication device indicates that there is no other network device between the network device and the communication device. The network device is a previous hop of the communication device on a path of a data flow sent by another communication device to the communication device. An indirect connection between the network device and the communication device indicates that there is another network device between the network device and the communication device. The network device is a network device located between the another network device and the previous hop of the communication device on the path of the data flow sent by the another communication device to the communication device. For ease of description, the network device directly connected to the communication device is referred to as a last hop node, and the network device indirectly connected to the communication device is referred to as an intermediate node in the following description.

The communication network 120 may specifically be a data center network, and the data center network may include a plurality of switches, such as a spine switch and a top-of-rack (TOR) switch. The spine switch is an intermediate node, and the TOR switch is a last hop node.

When the different communication devices 110 communicate with each other by using the communication network 120, a communication device (for example, a network device 110A) sending a data flow is a sending device of the data flow, and a communication device (for example, a communication device 110B) receiving the data flow is a receiving device of the data flow. On a path for transmitting the data flow, a network device (for example, the network device 130B) connected to the receiving device is a previous hop of the receiving device, and may also be referred to as a last hop network device on the path.

In this embodiment, to control network congestion, congestion control may be performed on one or more network devices of the communication network 120, that is, the congestion control is performed by using congestion control information of the network device. For ease of description, the network device may also be referred to as a congestion control point in the following description.

As shown in FIG. 1, if the congestion control is performed on the network device 130E and the network device 130B, congestion control points in the communication system 100 include the network device 130E and the network device 130B.

When the congestion control is performed on the congestion control point, the congestion control may be performed on all egress ports of the congestion control point. T be specific, a rate at which a sending device of a data flow forwarded through all the egress ports sends the data flow is controlled. Alternatively, the congestion control may be performed on some egress ports of the congestion control point. To be specific, a rate at which a sending device of a data flow forwarded through the some egress ports sends the data flow is controlled. The method in this embodiment may be used for any egress port.

One egress port may correspond to only one queue or a plurality of queues. Each queue is used to transmit a data packet of at least one data flow. When the congestion control is performed, congestion control may be performed on all queues of the egress port or some queues of the egress port. The method in this embodiment may be used for any queue of any egress port.

The data flow may specifically be a Transmission Control Protocol (TCP) flow, a User Datagram Protocol (UDP) flow, a remote direct memory access (RDMA) flow, or the like.

According to this embodiment, when the congestion control is performed based on one queue, an active data flow (referred to as an active flow for short) corresponding to the queue needs to be identified. The active flow may be a data flow in which a data packet is being transmitted within a statistical period. A quantity of active flows corresponding to the queue refers to a quantity of data flows to which a data packet in the queue belongs, to be specific, a quantity of data flows that correspond to the queue and in which the data packet is being transmitted within the statistical period. Specifically, the active flow may be identified according to the method provided in Chinese Patent App. No. 201811119974.6 or Chinese Patent App. No. 201811119579.8.

Figure 2:
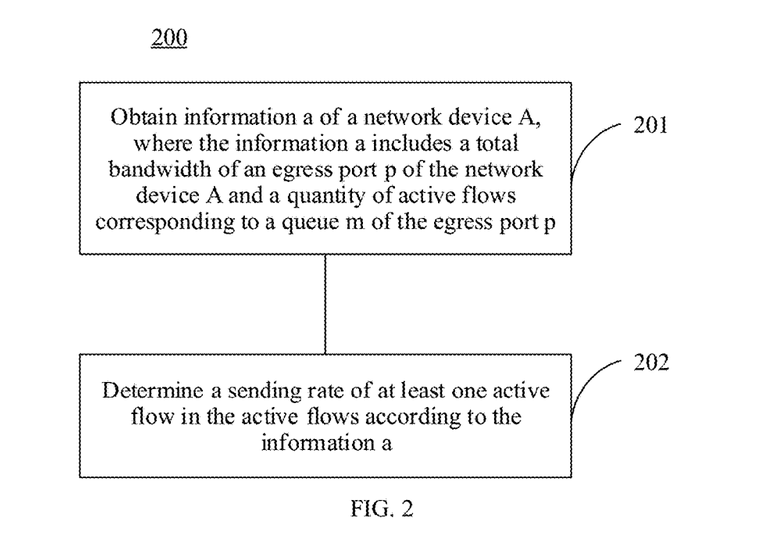
FIG. 2 is a schematic flowchart of a method 200 according to an embodiment.
Figure 3:
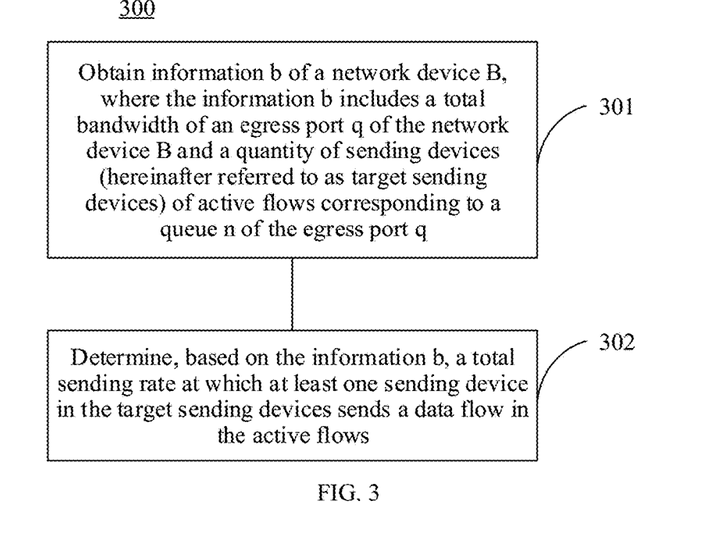
FIG. 3 is a schematic flowchart of a method 300 according to an embodiment.

The following describes methods 200 and 300 provided in embodiment 1 with reference to FIG. 2 and FIG. 3.

In the method 200, a sending rate of a single active flow is determined. Then, a sending device of the active flow sends the active flow at the sending rate.

In the method 300, a total sending rate of an active flow sent by a sending device is determined. Then, the sending device determines, based on the total sending rate, a sending rate of each active flow sent by the device, and sends each active flow at the sending rate.

For ease of description, a network device used as a congestion control point in the method 200 is referred to as a network device A in the following description. The network device A may include a plurality of egress ports, and each egress port may correspond to a plurality of queues. Congestion control may be performed on any queue of any egress port by using the method 200. For ease of description, in the method 200, congestion control information of the network device A is referred to as information a; an egress port, of the network device A, on which the congestion control is performed is referred to as an egress port p; a queue, of the egress port p, on which the congestion control is performed is referred to as a queue m in the following description. The network device A may specifically be any network device 130 in a communication system 100.

Similarly, a network device used as a congestion control point in the method 300 is referred to as a network device B in the following description. The network device B may include a plurality of egress ports, and each egress port may correspond to a plurality of queues. Congestion control may be performed on any queue of any egress port by using the method 300. For ease of description, in the method 300, congestion control information of the network device B is referred to as information b; an egress port, of the network device B, on which the congestion control is performed is referred to as an egress port q; a queue, of the egress port q, on which the congestion control is performed is referred to as a queue n in the following description. The network device B may specifically be any network device 130 in the communication system 100. In a specific implementation, the network device B may specifically be any network device 130 that is in the communication system 100 and that is directly connected to a communication device 110.

As shown in FIG. 2, the method 200 includes the following steps.

Step 201: Obtain the information a of the network device A, where the information a includes a total bandwidth of the egress port p of the network device A and a quantity of active flows corresponding to the queue m of the egress port p.

Step 202: Determine a sending rate of at least one active flow (hereinafter referred to as a first data flow) in the active flows according to the information a.

The sending rate is used by a sending device of the first data flow to send the first data flow.

The sending rate is positively related to the total bandwidth. During specific implementation, the sending rate may be directly proportional to the total bandwidth.

The sending rate is also negatively related to the quantity of active flows. During specific implementation, the sending rate may be inversely proportional to the quantity of active flows. For example, a quotient of the total bandwidth and the quantity of active flows is directly used as the sending rate.

If the queue m corresponds to a plurality of active flows, sending rates of some data flows in the plurality of active flows (for example, one data flow in the plurality of active flows) may be determined, or a sending rate of each data flow in the plurality of active flows may be determined. The data flows may have the same determined sending rate, for example, a quotient of the total bandwidth and the quantity of active flows is used as a sending rate of each data flow.

To fully utilize a bandwidth of the port p and increase throughput of the port p, an occupied bandwidth of the egress port p may further be used when the sending rate is determined. In other words, the information a further includes the occupied bandwidth of the egress port p and the sending rate is negatively related to the occupied bandwidth.

Because a queue depth of the queue m reflects a current congestion degree or a congestion risk degree, the queue depth of the queue m may be further used when the sending rate is determined. In other words, the information a further includes the queue depth of the queue m, and the sending rate is negatively related to the queue depth.

In an implementation (hereinafter referred to as implementation X1), the method 200 may be performed by the network device A. Correspondingly, after performing step 202, the network device A further sends the sending rate to the sending device. Then, the sending device sends the first data flow at the sending rate. During specific implementation, if the queue m corresponds to the plurality of active flows, the network device A may determine a sending rate of each active flow in step 202, and send the sending rate of the active flow to a sending device of each active flow. Then, the sending device of the active flow sends the active flow at the sending rate.

Specifically, the network device A may perform step 202 when a trigger condition is detected, where the trigger condition includes at least one of the following conditions: the quantity of active flows corresponding to the queue m changes; the queue depth of the queue m exceeds a queue depth threshold or usage of the queue m exceeds a queue usage threshold (for example, 80%); the occupied bandwidth of the port q exceeds a bandwidth threshold or bandwidth usage of the port q exceeds a bandwidth usage threshold (for example, 80%).

In another implementation (hereinafter referred to as implementation Y1), the method 200 may be performed by the sending device of the first data flow. Correspondingly, the sending device of the first data flow receives the information a from the network device A. The network device A may send the information a to the sending device of the first data flow when the trigger condition is detected. During specific implementation, if the queue m corresponds to the plurality of active flows, the network device A may send the information a to the sending device of each active flow. Correspondingly, the sending device of the active flow performs step 202 to determine the sending rate of the active flow, and sends the active flow at the sending rate.

In still another implementation (hereinafter referred to as implementation Z1), the method 200 may be performed by a receiving device of the first data flow. Correspondingly, the receiving device of the first data flow receives the information a from the network device A, and sends the sending rate of the first data flow to the sending device of the first data flow after the method 202 is performed to determine the sending rate of the first data flow. The network device A may send the information a to the receiving device of the first data flow when the trigger condition is detected. During specific implementation, if the queue m corresponds to the plurality of active flows, the network device A may send the information a to a receiving device of each active flow. Correspondingly, the receiving device of the active flow performs step 202 to determine the sending rate of the active flow, and sends the sending rate to the sending device of the active flow. Then, the sending device of the active flow sends the active flow at the sending rate.

As shown in FIG. 3, the method 300 includes the following steps.

Step 301: Obtain the information b of the network device B, where the information b includes a total bandwidth of an egress port q of the network device B and a quantity of sending devices of active flows corresponding to the queue n of the egress port q.

For ease of description, a sending device of an active flow corresponding to the queue n is referred to as a target sending device in the following description.

Assuming that there are three active flows corresponding to the queue n, a sending device of two of the active flows is a device 1, and a sending device of one active flow is a device 2, the quantity of sending devices of the active flows corresponding to the queue n, namely, the quantity of target sending devices is 2.

Step 302: Determine, based on the information b, a total sending rate at which at least one sending device (hereinafter referred to as a first sending device) in the target sending devices sends a target data flow.

The target data flow refers to all data flows that are sent by the first sending device by using the network device B and that correspond to a first queue. It should be noted that the target data flow may include one data flow or a plurality of data flows.

The network device B may specifically be a last hop node and is a last hop network device on a path of the active flow. Because one egress port can be connected to only one communication device, the active flow corresponds to a same receiving device. When collecting statistics on the quantity of target sending devices, the network device B may collect statistics on a quantity of source Internet Protocol (IP) addresses that are in the active data flow and that correspond to a same destination IP address (that is, an IP address of a receiving device connected to the egress port q).

The total sending rate is positively related to the total bandwidth. During specific implementation, the total sending rate may be directly proportional to the total bandwidth.

The total sending rate is also negatively related to a quantity of active flows. During specific implementation, the total sending rate may be inversely proportional to the quantity of target sending devices. For example, a quotient of the total bandwidth and the quantity of target sending devices is directly used as the total sending rate.

If there are a plurality of target sending devices, a total sending rate corresponding to some of the plurality of target sending devices (for example, one of the plurality of target sending devices) may be determined, or a total sending rate corresponding to each of the plurality of target sending devices may be determined. The target sending devices may have the same determined total sending rate. For example, a quotient of a total bandwidth and a quantity of target sending devices is used as the total sending rate corresponding to each target sending device.

To fully utilize the bandwidth of the port q and increase throughput of the port q, an occupied bandwidth of the egress port q may further be used when the total sending rate is determined. In other words, the information b further includes the occupied bandwidth of the egress port q and the total sending rate is negatively related to the occupied bandwidth.

Because a queue depth of the queue n reflects a current congestion degree or a congestion risk degree, the queue depth of the queue n may be further used when the total sending rate is determined. In other words, the information b further includes the queue depth of the queue n, and the total sending rate is negatively related to the queue depth.

In an implementation (hereinafter referred to as implementation X2), the method 300 may be performed by the network device B. Correspondingly, after performing step 302, the network device B further sends the total sending rate to the first sending device. Then, the first sending device sends the target data flow at the total sending rate. Specifically, the first sending device determines, based on the total sending rate, a sending rate of each data flow that is sent by the device and that belongs to the target data flow, and sends a corresponding data flow at the sending rate. If the target data flow includes only one data flow, the total sending rate may be directly used as a sending rate of the data flow. If the target data flow includes the plurality of data flows, the total sending rate may be evenly allocated to the plurality of data flows. Alternatively, the total sending rate may be allocated based on a current sending rate of each data flow, for example, a magnitude of sending rate allocated to each data flow is positively related (for example, directly proportional) to a magnitude of a current sending rate of a data flow.

During specific implementation, if the queue n corresponds to the plurality of target sending devices, the network device B may determine the total sending rate corresponding to each target sending device in step 302, and send a corresponding total sending rate to each target sending device. Then, the target sending device sends a corresponding target data flow at the total sending rate.

Specifically, the network device B may perform step 302 when a rigger condition is detected, where the trigger condition includes at least one of the following conditions: the quantity of target sending devices corresponding to the queue m changes; the queue depth of the queue m exceeds a queue depth threshold or usage of the queue m exceeds a queue usage threshold (for example, 80%); the occupied bandwidth of the port q exceeds a bandwidth threshold or bandwidth usage of the port q exceeds a bandwidth usage threshold (for example, 80%).

In another implementation (hereinafter referred to as implementation Y2), the method 300 may be performed by the first sending device. Correspondingly, the first sending device receives the information b from the network device B. The network device B may send the information b to the first sending device when the trigger condition is detected. During specific implementation, if the queue n corresponds to the plurality of target sending devices, the network device B may send the information b to each target sending device. Correspondingly, the target sending device performs step 202 to determine a corresponding total sending rate, and further sends a corresponding data flow at the total sending rate.

In still another implementation (hereinafter referred to as implementation Z2), the method 300 may be performed by a receiving device of the target data flow. Correspondingly, the receiving device of the target data flow receives the information b from the network device B. The network device B may send the information b to the receiving device of the target data flow when the trigger condition is detected. Correspondingly, the receiving device performs step 302 to determine the total sending rate of the target data flow, and sends the total sending rate to the sending device of the target data flow. Then, the sending device of the target data flow sends the target data flow at the total sending rate.

The following describes specific implementations of calculating the sending rate in the method 200 and the total sending rate in the method 300. For ease of description, the network device A and the network device B are collectively referred to as the target network device, the egress port p and the egress port q are collectively referred to as a target egress port, and the queue m and the queue n are collectively referred to as a target queue. The sending rate in the method 200 and the total sending rate in the method 300 are collectively referred to as a target rate.

In the foregoing methods 200 and 300, the target rate may be calculated according to the following formula:

$$\text{rate} = \frac{C + \alpha \times (C - Cout)}{N} - \beta \times \frac{qLen}{\frac{T}{N}}, \quad (1)$$

where rate is the target sending rate, C is a total bandwidth of the target egress port, Cout is an occupied bandwidth of the target egress port, qLen is a queue depth of the target queue, both α and β are constants greater than 0 and less than 1, and T is preset duration. T may be preset duration in which current data in the target queue needs to be sent completely. It may be understood that, if no new data packet enters the target queue, after the preset duration, the target queue is cleared. Therefore, T may also be referred to as queue clearing duration.

When the formula is used in the method 200, rate is the sending rate, C is the total bandwidth of the egress port p, Cout is the occupied bandwidth of the egress port p, N is the quantity of active flows corresponding to the queue m, and qLen is the queue depth of the queue m.

When the formula is used in the method 300, rate is the total sending rate, C is the total bandwidth of the egress port q, Cout is occupied bandwidth of the egress port q, N is the quantity of sending devices of active flows corresponding to the queue n, and qLen is the queue depth of the queue n.

In the foregoing formula 1, C/N is used to evenly allocate a bandwidth. When a queue depth is increased because a new data flow is added, a sending rate of the data flow may be reduced to empty a queue, where a strength of emptying the queue may be controlled through the parameter B. To increase throughput of an egress port, a sending rate of data flows can be increased to prevent low throughput. An increase rate can be controlled through the parameter a.

If the target egress port corresponds to more than one queue, the formula may be used to calculate the target rate for each queue.

If a plurality of queues have a same priority but correspond to different weights, for any one of the plurality of queues having the same priority, the target rate of the queue may be further calculated based on the weight of the queue and weights of other queues having the same priority. The calculated target rate of the queue is positively related to the weight of the queue.

It is assumed that the target network device includes eight queues. A priority of a queue 1 is higher than a priority of a queue 2, the priority of the queue 2 is higher than a priority of a queue 3, priorities of queues 3 to 6 are the same, a priority of the queue 6 is higher than a priority of a queue 7, and the priority of the queue 7 is higher than a priority of a queue 8. Queue depths of the queues 1 to 8 are qLen1 to qLen8 in sequence. The queues 3 to 6 are scheduled by using a weighted round robin (WRR) algorithm, and weights are w1, w2, w3, and w4 in sequence. The entire queues 3 to 6 and the queues 1, 2, 7, and 8 are scheduled by using a strict priority (SP) algorithm.

For any one of the queues 1, 2, 7, and 8, the formula 1 may be used to calculate the target rate.

For the queues 3 to 6, the following formulas may be used to calculate the target rate.

$$\text{Queue 3 : rate} = w1 \times \frac{C + \alpha \times (C - Cout)}{w1 \times N3 + w2 \times N4 + w3 \times N5 + w4 \times N6} - \beta \times \frac{\frac{qLen3}{T}}{N3} \quad (2-1)$$

$$\text{Queue 4 : rate} = w2 \times \frac{C + \alpha \times (C - Cout)}{w1 \times N3 + w2 \times N4 + w3 \times N5 + w4 \times N6} - \beta \times \frac{\frac{qLen4}{T}}{N4} \quad (2-2)$$

$$\text{Queue 5 : rate} = w3 \times \frac{C + \alpha \times (C - Cout)}{w1 \times N3 + w2 \times N4 + w3 \times N5 + w4 \times N6} - \beta \times \frac{\frac{qLen5}{T}}{N5} \quad (2-3)$$

$$\text{Queue 6 : rate} = w4 \times \frac{C + \alpha \times (C - Cout)}{w1 \times N3 + w2 \times N4 + w3 \times N5 + w4 \times N6} - \beta \times \frac{\frac{qLen6}{T}}{N6} \quad (2-4)$$

When formulas 2-1 to 2-4 are used in the method 200, N3 to N6 are quantities of active flows corresponding to the queue 3 to the queue 6. When the formulas 2-1 to 2-4 are used in the method 300, N3 to N6 are quantities of sending devices of the active flows corresponding to the queue 3 to the queue 6.

In the method 200 and the method 300, a rate can be carried in a rate control packet (for example, the sending rate of the first data flow in the method 200 and the total sending rate in the method 300). The rate control packet may specifically be a congestion notification packet (CNP), an acknowledgment (ACK) packet, or the like.

In the method 200, the rate control packet may further include an identifier of the first data flow, for example, a 5-tuple of the first data flow.

In the method 300, the rate control packet may further include an identifier of the receiving device of the target data flow, for example, an IP address of the receiving device. The identifier of the receiving device is used by the sending device to determine a data flow belonging to the target data flow.

When the port q corresponds to the plurality of queues, because different queues generally correspond to different data flow priorities, the rate control packet may further include a data flow priority corresponding to the queue n, and the data flow priority is used by the sending device to determine the data flow belonging to the target data flow. That is, a data flow having the data flow priority is determined as the data flow belonging to the target data flow. The data flow priority may specifically be a wireless local area network (WLAN) priority or a differentiated service code point (DSCP) value, and the like. For example, if the queue n is used to transmit a data flow whose DSCP values are x and y, the rate control packet may carry the DSCP values x and y. Correspondingly, the first sending device determines the data flow whose DSCP values are x and y as the data flow belonging to the target data flow.

In a specific implementation, the network device B is the last hop node, and a sent rate control packet includes the identifier of the receiving device. If the port q corresponds to the plurality of queues, the rate control packet further includes the data flow priority corresponding to the queue n.

In another specific implementation, the network device B is an intermediate node, the port q corresponds to the plurality of queues, and the sent rate control packet includes the data flow priority corresponding to the queue n.

An example implementation of congestion control using the method 200 is described below with reference to FIGS. 4A and 4B.

Figure 4A:
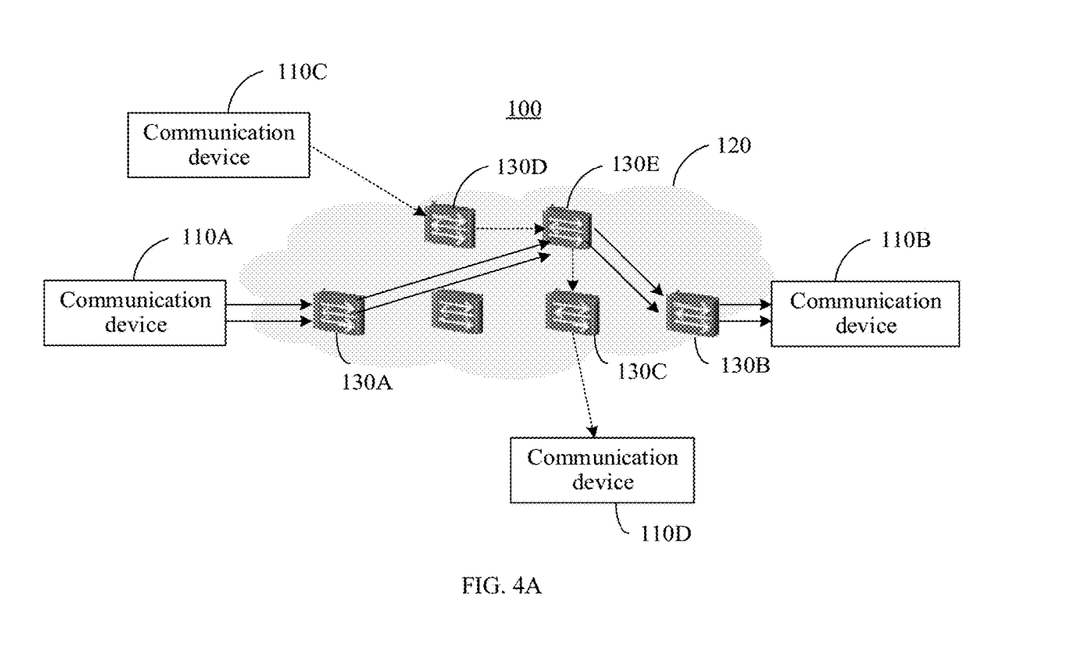
FIG. 4A and FIG. 4B are a schematic diagram of an example implementation according to an embodiment.

As shown in FIG. 4A, in the example implementation, a communication device 110A sends a data flow 11 and a data flow 12 to a communication device 110B by using a network device 130A, a network device 130E, and a network device 130B. A communication device 110C sends a data flow 21 to a communication device 110D by using a network device 130D, the network device 130E, and a network device 130C. The network device 130E is a congestion control point.

Figure 4B:
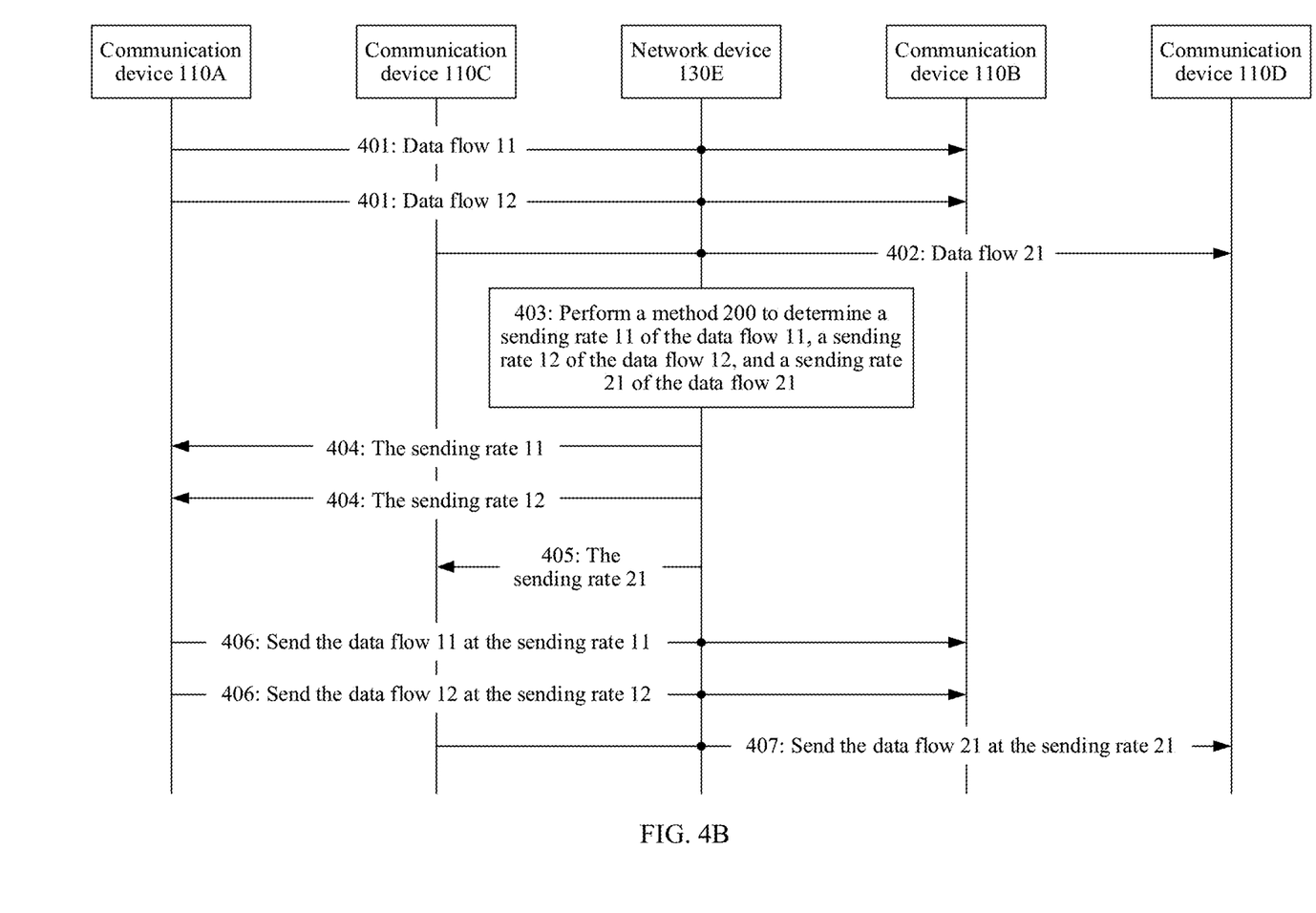

As shown in FIG. 4B, the example implementation manner includes the following steps.

Step 401: The communication device 110A sends the data flow 11 and the data flow 12 to the communication device 110B by using the network device 130E.

Step 402: The communication device 110C sends the data flow 21 to the communication device 110D by using the network device 130E.

In this example implementation, it is assumed that the network device 130E sends the data flows 11, 12, and 21 through a same queue on a same egress port.

Step 403: The network device 130E performs the method 200 to determine a sending rate 11 of the data flow 11, a sending rate 12 of the data flow 12, and a sending rate 21 of the data flow 21.

The determined sending rates 11, 12, and 21 are generally the same. For example, the sending rate calculated according to formula 1 is used as the sending rates 11, 12, and 21.

It should be noted that actions of sending a data flow in step 401 and step 402 are persistent actions. When step 403 is performed, the data flows 11, 12, and 21 are all active flows.

Step 404: The network device 130E sends the sending rate 11 and the sending rate 12 to the communication device 110A.

Specifically, a rate control packet sent to the communication device 110A may carry the sending rate 11 and the sending rate 12, or different rate control packets sent to the communication device 110A may separately carry the sending rate 11 and the sending rate 12.

Step 405: The network device 130E sends the sending rate 21 to the communication device 110C.

Step 406: The communication device 110A sends the data flow 11 at the sending rate 11 and sends the data flow 12 at the sending rate 12.

Step 407: The communication device 110C sends the data flow 21 at the sending rate 21.

It should be noted that there is no specific sequence between step 404 and step 405.

An example implementation of congestion control using the method 300 is described below with reference to FIGS. 5A and 5B.

Figure 5A:
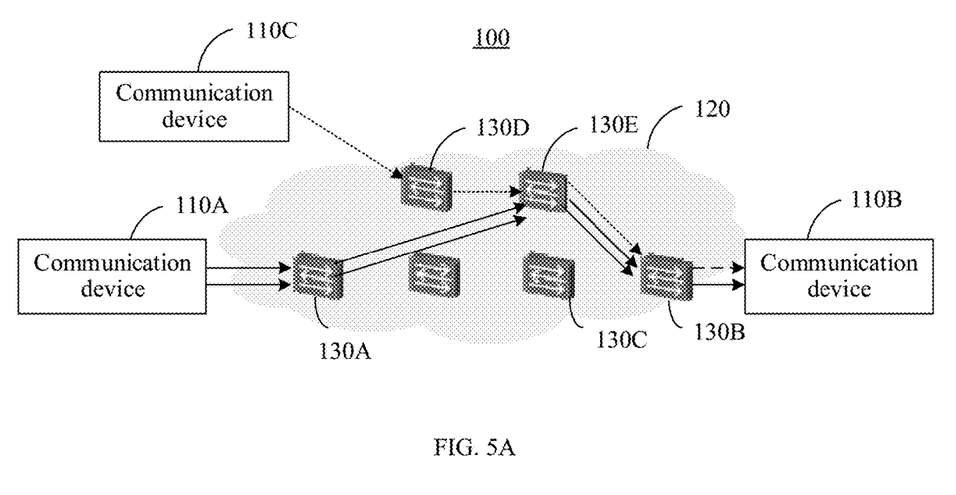
FIG. 5A and FIG. 5B are a schematic diagram of another example implementation according to an embodiment.

As shown in FIG. 5A, in the example implementation, a communication device 110A sends a data flow 11 and a data flow 12 to a communication device 110B by using a network device 130A, a network device 130E, and a network device 130B. A communication device 110C sends a data flow 22 to the communication device 110B by using a network device 130D, the network device 130E, and the network device 130B. The network device 130B is a congestion control point.

Figure 5B:
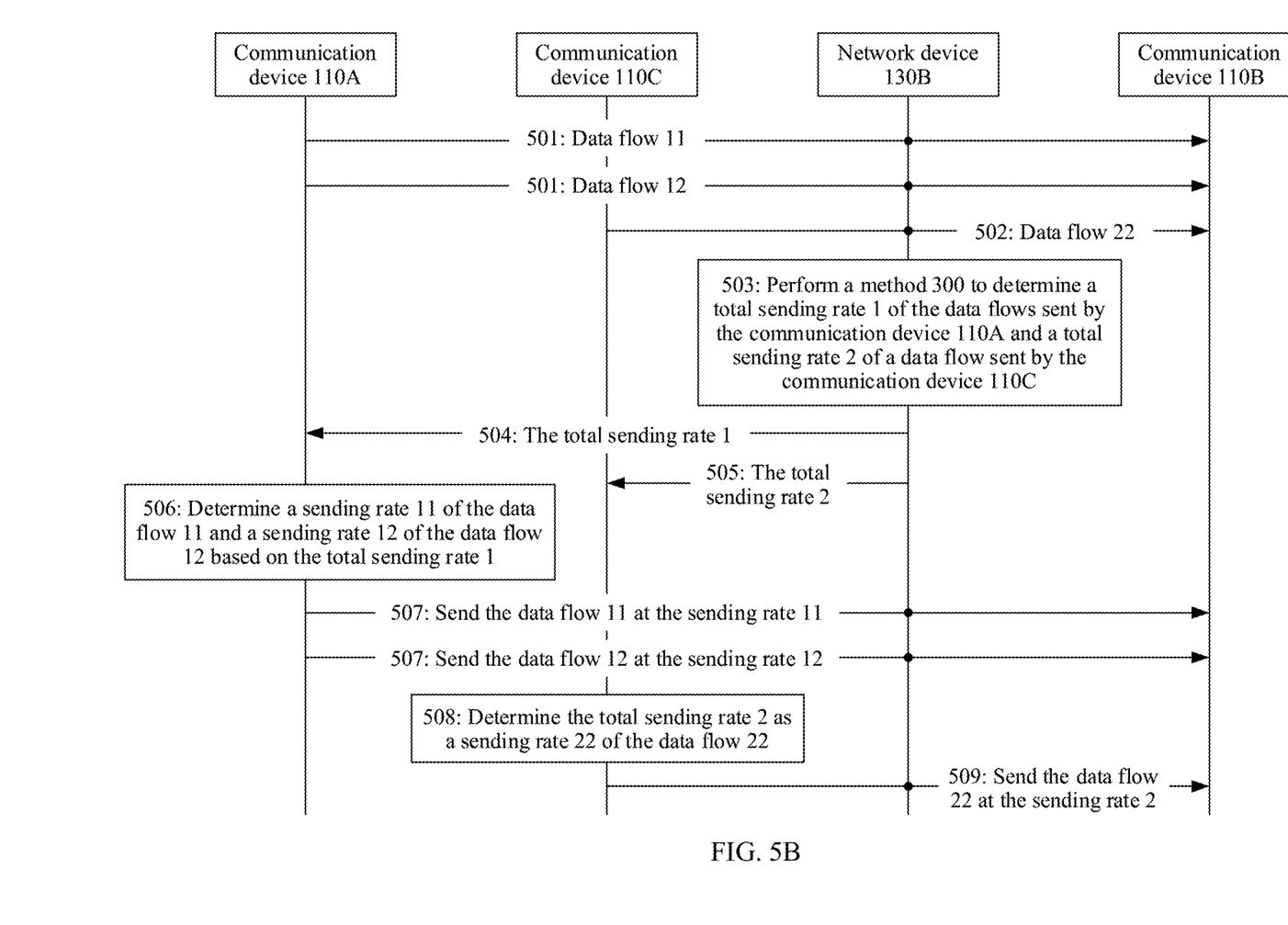

As shown in FIG. 5B, the example implementation includes the following steps.

Step 501: The communication device 110A sends the data flow 11 and the data flow 12 to the communication device 110B by using the network device 130B.

Step 502: The communication device 110C sends the data flow 22 to the communication device 110B by using the network device 130B.

In this example implementation, it is assumed that the network device 130B sends the data flows 11, 12, and 22 through a same queue on a same egress port.

Step 503: The network device 130B performs the method 300 to determine a total sending rate 1 of the data flows (namely, the data flows 11 and 12) sent by the communication device 110A and a total sending rate 2 of a data flow (that is, the data flow 22) sent by the communication device 110C.

The determined total sending rate 1 and total sending rate 2 are generally the same. For example, the total sending rate calculated according to formula 1 is used as the total sending rate 1 and the total sending rate 2.

It should be noted that actions of sending a data flow in step 501 and step 502 are persistent actions. When step 503 is performed, the data flows 11, 12, and 22 are all active flows.

Step 504: The network device 130B sends the total sending rate 1 to the communication device 110A.

Step 505: The network device 130B sends the total sending rate 2 to the communication device 110C.

Steps 506 and 507: The communication device 110A determines a sending rate 11 of the data flow 11 and a sending rate 12 of the data flow 12 based on the total sending rate 1, sends the data flow 11 at the sending rate 11 and sends the data flow 12 at the sending rate 12.

Steps 508 and 509: The communication device 110C determines the total sending rate 2 as a sending rate 22 of the data flow 22, and sends the data flow 22 at the sending rate 22.

It should be noted that there is no specific sequence between steps 506 and 507, and between steps 508 and 509.

In a real network environment, congestion usually occurs at a last hop network device on a data flow path (hereinafter referred to as last hop congestion). The congestion is mainly caused by adding more traffic, that is, the network device needs to send, by using one port, a data flow received by using a plurality of ports to a communication device directly connected to the network device. This causes the congestion. To resolve this problem, the congestion control may be performed on a network device (for example, the network device 130B) directly connected to the communication device based on a data flow that uses the network device as the last hop network device. Specifically, the method 300 may be implemented on the network device to resolve the last hop congestion problem.

During specific implementation, the method 200 and the method 300 may be used together.

For example, the method 300 is implemented on a network device (for example, the network device 130B) directly connected to the communication device, and the method 200 is implemented on a network device (for example, the network device 130E) indirectly connected to the communication device.

When the method 200 and the method 300 are used together, a receiving rate of a sending device may be a sending rate of a single data flow, or may be a total sending rate of a target data flow including at least one data flow. Therefore, a rate control packet carrying a rate further carries a type identifier, and the type identifier is used to identify whether the rate carried in the rate control packet is the sending rate of the single data flow or the total sending rate of the target data flow including at least one data flow. Correspondingly, the sending device identifies, based on a type identifier in a received rate control packet, a type of the rate carried in the rate control packet. If the rate is the sending rate of the single data flow (that is, a first data flow), a corresponding data flow may be directly sent at the sending rate. If the rate is the total sending rate of the target data flow including the at least one data flow, the sending rate of the single data flow is determined based on the rate and the corresponding data flow is sent at the determined sending rate of the single data flow.

It should be noted that, regardless of whether the method 200 or the method 300 is used alone or the method 200 and the method 300 are used together, when there are a plurality of congestion control points on a path of a data flow sent by a sending device, the sending device may receive a plurality of rate control packets. In this case, a minimum sending rate in a plurality of sending rates corresponding to the data flow may be determined as the sending rate at which the data flow is sent. For example, when the method 200 and the method 300 are used together, both the total sending rate of the target data flow and the sending rate of the first data flow may be received. After the sending rate of the first data flow is determined based on the total sending rate of the target data flow, the first data flow may be sent at a minimum value of the determined sending rate of the first data flow and the received sending rate of the first data flow.

Figure 6:
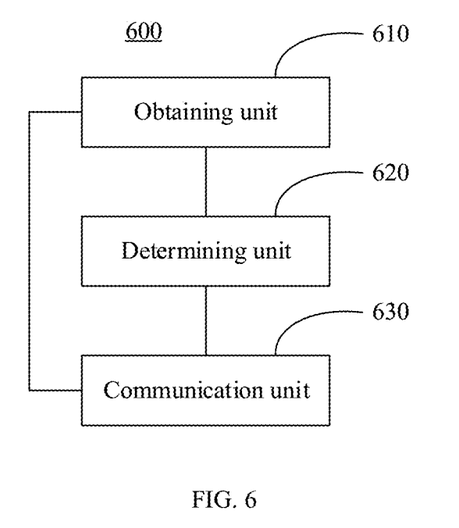
FIG. 6 is a schematic diagram depicting a structure of an apparatus 600 according to an embodiment.

According to embodiment 1, embodiment 2 provides an apparatus 600 for implementing congestion control. The apparatus 600 is configured to perform the method 200 or 300 in the embodiment 1. As shown in FIG. 6, the apparatus 600 includes an obtaining unit 610, a determining unit 620, and a communication unit 630.

When the apparatus 600 is configured to implement the method 200, the obtaining unit 610 is configured to perform step 201 of the method 200, and the determining unit 620 is configured to perform step 202 of the method 200.

Specifically, the obtaining unit 610 is configured to obtain information a of a network device A, where the information a includes a total bandwidth of an egress port p of the network device A and a quantity of active flows corresponding to a queue m of the egress port p. The determining unit 620 is configured to determine a sending rate of at least one active flow (namely, a first data flow) in the active flows according to the information a.

In an implementation, the apparatus 600 is specifically the network device A, and the communication unit 630 is configured to send the sending rate to the sending device.

In another implementation, the apparatus 600 is specifically a sending device of the first data flow. The communication unit 630 is configured to receive the information a from the network device A, and send the information a to the obtaining unit 610. The communication unit 630 is further configured to send the first data flow at the sending rate.

In still another implementation, the apparatus 600 is specifically a receiving device of the first data flow. The communication unit 630 is configured to receive the information a from the network device A, send the information a to the obtaining unit 610, and is further configured to send the sending rate of the first data flow to the sending device of the first data flow.

When the apparatus 600 is configured to implement the method 300, the obtaining unit 610 is configured to perform step 301 of method 300, and the determining unit 620 is configured to perform step 302 of the method 300.

Specifically, the obtaining unit 610 is configured to obtain information b of a network device B, where the information b includes a total bandwidth of an egress port q of the network device B and a quantity of sending devices (hereinafter referred to as target sending devices) of active flows corresponding to a queue n of the egress port q. The determining unit 620 is configured to determine, based on the information b, a total sending rate at which at least one sending device (hereinafter referred to as a first sending device) in the target sending devices sends a target data flow.

In an implementation, the apparatus 600 is specifically the network device B, and the communication unit 630 is configured to send the total sending rate to the sending device.

In another implementation, the apparatus 600 is specifically the first sending device. The communication unit 630 is configured to receive the information b from the network device B. The obtaining unit 610 is further configured to obtain the information b received by the communication unit 630. If the target data flow includes a plurality of data flows, the determining unit 620 is further configured to determine a sending rate of each data flow in the target data flow based on the total sending rate. The communication unit 630 is further configured to send, for each data flow of the target data flow, the data flow at a corresponding sending rate.

In still another implementation, the apparatus 600 is specifically the receiving device of the target data flow. The communication unit 630 is configured to receive the information b from the network device B, and is further configured to send the sending rate of the target data flow to the sending device of the target data flow. The obtaining unit 610 is further configured to obtain the information b received by the communication unit 630.

Figure 7:
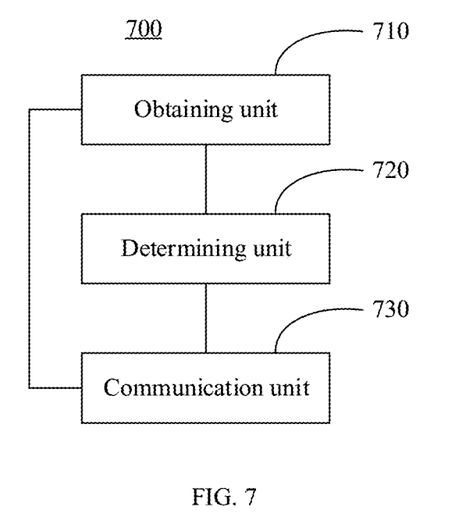
FIG. 7 is a schematic diagram depicting a structure of an apparatus 700 according to an embodiment.

According to embodiment 1, embodiment 3 provides an apparatus 700 for implementing congestion control. As shown in FIG. 7, the apparatus 700 includes an obtaining unit 710, a determining unit 720, and a communication unit 730.

An obtaining unit 710 is configured to obtain a total sending rate of a target data flow, where the target data flow may include one data flow, or may include a plurality of data flows.

When the target data flow includes the plurality of data flows, the determining unit 720 is configured to determine a sending rate of each data flow in the target data flow based on the sending rate of the target data flow. Correspondingly, the communication unit 730 is configured to send the data flow based on a corresponding sending rate for each data flow of the target data flow, for example, send the data flow at a corresponding sending rate.

When the target data flow includes only one data flow (referred to as a first data flow), the determining unit 720 is configured to determine the sending rate of the target data flow as a sending rate of the first data flow, and the communications unit 730 is configured to send the first data flow based on the sending rate of the target data flow. For example, sending the first data flow at the sending rate of the first data flow.

The total sending rate may specifically be determined according to the method 300 in embodiment 1, that is, the total sending rate is determined based on information b of a network device B located between the apparatus 700 and a receiving device of the target data flow on a path of the target data flow. The information b includes a total bandwidth of an egress port q of the network device B and a quantity of sending devices (that is, target sending devices) of an active flow corresponding to a queue n of the egress port q. The target sending device includes the apparatus 700, and the target data flow is all data flows that are from the apparatus 700 and that correspond to the queue n.

If implementation X2 of embodiment 1 is used, the communication unit 730 is further configured to receive the total sending rate from the network device B. Correspondingly, the obtaining unit 710 is further configured to receive the total sending rate from the communication unit 730.

If implementation Y2 is used, the communication unit 730 is further configured to receive the information b from the network device B. Correspondingly, the obtaining unit 710 is further configured to receive the information b from the communication unit 730, and determine the total sending rate of the target data flow based on the information b.

If implementation Z2 of embodiment 1 is used, the communication unit 730 is further configured to receive the total sending rate from the receiving device of the target network device. Correspondingly, the obtaining unit 710 is further configured to receive the total sending rate from the communication unit 730.

During specific implementation, a previous hop of the receiving device of the target data flow may determine the total sending rate by using the method 300. In addition, an intermediate node on a path of a data flow (that is, the first data flow) in the target data flow may further determine the sending rate of the first data flow by using the method 200 and send the sending rate of the first data flow to the apparatus 700 by using implementation Z1.

A receiving rate of the apparatus 700 may be a sending rate of a single data flow, or may be the total sending rate of the target data flow including at least one data flow. Therefore, a rate control packet carrying a rate further carries a type identifier, and the type identifier is used to identify whether the rate carried in the rate control packet is the sending rate of the single data flow or the total sending rate of the target data flow including the at least one data flow. Correspondingly, the determining unit 720 is further configured to identify, based on the type identifier of a received rate control packet, a type of the rate carried in the rate control packet. When the communication unit 730 simultaneously receives the total sending rate of the target data flow and the sending rate of the first data flow, the first data flow may be sent at a minimum value of the determined sending rate of the first data flow and a received sending rate of the first data flow after determining the sending rate of the first data flow based on the total sending rate of the target data flow.

Figure 8:
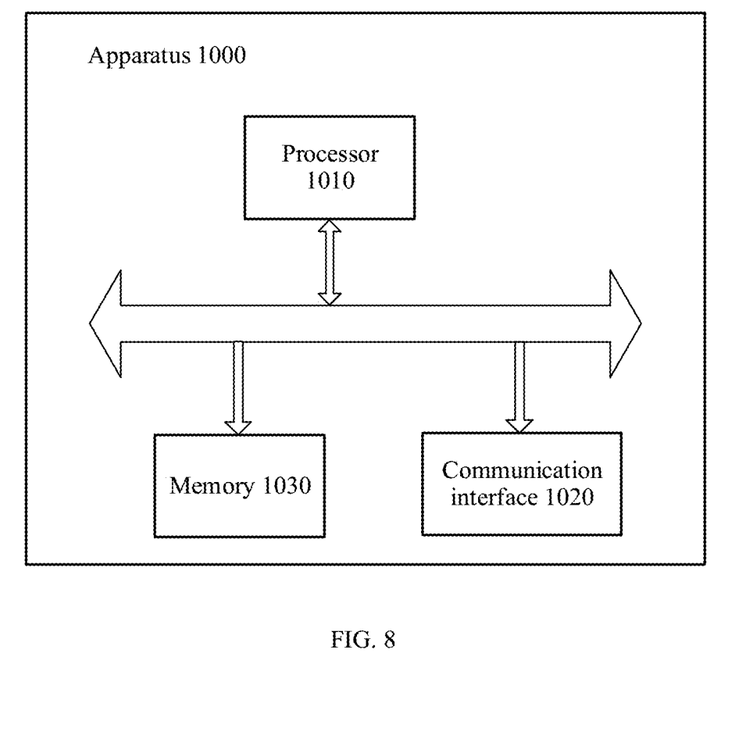
FIG. 8 is a schematic diagram depicting a structure of an apparatus 1000 according to an embodiment.

According to embodiment 1, embodiment 4 provides an apparatus 1000 for implementing congestion control. The apparatus 1000 may specifically be a network device, for example, a switch or a router, or may be a communication device, for example, a user terminal or a server. As shown in FIG. 8, the apparatus 1000 includes a processor 1010 and a communication interface 1020, and may further include a memory 1030. The processor 1010, the communication interface 1020, and the memory 1030 may communicate with each other by using a bus.

The processor 1010 may specifically be a central processing unit (CPU) or an application-specific integrated circuit (ASIC), or may be configured as one or more integrated circuits that implement this embodiment.

The memory 1030 may specifically be a high-speed random-access memory (RAM) memory, or may be a non-volatile memory (non-volatile memory).

The processor 1010 is configured to perform operations in the method 200 or 300 in embodiment 1, or perform operations performed by the sending device of the first data flow or the target data flow in embodiment 1. Specifically, the operation may be performed by executing computer operation instructions stored in a memory 1030. The communication interface 1020 is configured to communicate with another device.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

In the embodiments, the terms "first", "second", and "third" are merely used for description, but cannot be understood as an indication or implication of relative importance. The term "at least one" means one or more, and the term "a plurality of" means two or more, unless otherwise expressly limited.

The term "and/or" describes only an association relationship for describing associated objects and indicates that three relationships may exist. For example, A and/or B may indicate the following three cases: Only A exists, both A and B exist, and only B exists. In addition, the character "/" in this specification usually indicates an "or" relationship between the associated objects.

The foregoing descriptions are merely optional embodiments, but are not intended to limit this disclosure. Any modification, equivalent replacement, or improvement made within the concepts and principles herein should fall within the protection scope of this disclosure.

What is claimed is:

1. A method executed by a first sending device and comprising:
    sending a target data flow using a first rate, wherein the target data flow comprises at least one data flow, and wherein the first rate is based on an occupied bandwidth of a first egress port of a network device;
    obtaining the first rate by receiving the first rate from a first network device that is a previous hop of a receiving device of the target data flow on a transmission path of the target data flow;
    determining a sending rate of each data flow in the at least one data flow based on the first rate;

receiving, from a second network device between the first sending device and the first network device on the transmission path of a first data flow, a second rate for the first sending device to send the first data flow in the target data flow; and sending the first data flow at a minimum value of the second rate and a sending rate that is of the first data flow and that is based on the first rate.

2. The method of claim 1, wherein receiving the first rate comprises receiving, from the first network device, a first rate control packet comprising the first rate, an identifier of the first data flow, and a first type identifier identifying that the first rate is of a single data flow.

3. The method of claim 2, wherein receiving the second rate comprises receiving, from the second network device, a second rate control packet comprising the second rate and a second type identifier identifying that the second rate is a total sending rate of the target data flow.

4. The method of claim 3, further comprising determining, based on the first type identifier, that the first rate is a sending rate of a first video flow.

5. The method of claim 4, further comprising determining, based on the second type identifier, that the second rate is the total sending rate of the target data flow.

6. A method executed by a first sending device and comprising:
sending a target data flow using a first rate, wherein the target data flow comprises at least one data flow, and wherein the first rate is based on an occupied bandwidth of a first egress port of a network device;
obtaining the first rate by:
receiving, from the network device on a transmission path of the target data flow, first information comprising a total bandwidth of the first egress port and a quantity of target sending devices, wherein each of the target sending devices is a sending device of an active flow corresponding to a first queue of the first egress port, and wherein the target sending devices comprise the first sending device; and
determining the first rate based on the first information, wherein the first rate positively correlates to the total bandwidth and negatively correlates to the quantity of target sending devices; and
determining a sending rate of each data flow in the at least one data flow based on the first rate.

7. A system comprising:
a first network device configured to:
obtain first information of the first network device, wherein the first information comprises a first total bandwidth of a first egress port of the first network device and a first quantity of target sending devices; and
determine a total sending rate of a target data flow based on the first information, wherein the total sending rate positively correlates to the first total bandwidth and negatively correlates to the first quantity, and wherein the total sending rate is for sending the target data flow; and
a first sending device configured to:
receive the total sending rate from the first network device; and
determine a sending rate of each data flow in the target data flow based on the total sending rate.

8. The system of claim 7, wherein the first network device is a previous hop of a receiving device of the target data flow on a transmission path of the target data flow.

9. The system of claim 8, wherein the system further comprises a second network device between the first sending device and the first network device and configured to obtain second information of the second network device, and wherein the second information comprises a second total bandwidth of a second egress port of the second network device and a second quantity of active flows corresponding to a second queue of the second egress port.

10. The system of claim 9, wherein the second network device is further configured to determine a first sending rate of a first data flow in the active flows based on the second information, wherein the first sending rate positively correlates to the second total bandwidth and negatively correlates to the second quantity of active flows, and wherein the first sending rate is for a sending device of the first data flow to send the first data flow.

11. The system of claim 10, wherein the second network device is further configured to send the first sending rate to the first sending device.

12. The system of claim 11, wherein the first sending device is further configured to receive the first sending rate of the first data flow from the second network device.

13. The system of claim 12, wherein the first sending device is further configured to send the first data flow at a minimum value of a second rate received from the second network device and a sending rate of the first data flow based on the total sending rate.

14. A method comprising:
obtaining, by a first network device in a system, first information of the first network device, wherein the first information comprises a first total bandwidth of a first egress port of the first network device and a first quantity of target sending devices;
determining, by the first network device, a total sending rate of a target data flow based on the first information, wherein the total sending rate positively correlates to the first total bandwidth and negatively correlates to the first quantity, and wherein the total sending rate is for sending the target data flow;
receiving, by a first sending device of the system, the total sending rate from the first network device; and
determining, by the first sending device, a sending rate of each data flow in the target data flow based on the total sending rate.

15. The method of claim 14, wherein the first network device is a previous hop of a receiving device of the target data flow on a transmission path of the target data flow.

16. The method of claim 15, further comprising obtaining, by a second network device between the first sending device and the first network device in the system, second information of the second network device, wherein the second information comprises a second total bandwidth of a second egress port of the second network device and a second quantity of active flows corresponding to a second queue of the second egress port.

17. The method of claim 16, further comprising determining, by the second network device, a first sending rate of a first data flow in the active flows based on the second information, wherein the first sending rate positively correlates to the second total bandwidth and negatively correlates to the second quantity of active flows, and wherein the first sending rate is for a sending device of the first data flow to send the first data flow.

18. The method of claim 17, sending, by the second network device, the first sending rate to the first sending device.

19. The method of claim 18, further comprising receiving, by the first sending device, the first sending rate of the first data flow from the second network device.

20. The method of claim 19, further comprising sending, by the first sending device, the first data flow at a minimum value of a second rate received from the second network device and a sending rate of the first data flow based on the total sending rate.

* * * * *